(12) United States Patent
Kim

(10) Patent No.: US 11,272,811 B2
(45) Date of Patent: Mar. 15, 2022

(54) BLENDER INCLUDING NOISE BLOCKING DEVICE

(71) Applicant: NUC Electronics Co., Ltd., Daegu (KR)

(72) Inventor: Ji Tae Kim, Daegu (KR)

(73) Assignee: NUC Electronics Co., Ltd., Daegu (KR)

( * ) Notice: Subject to any disclaimer, the term of this patent is extended or adjusted under 35 U.S.C. 154(b) by 261 days.

(21) Appl. No.: 16/503,185

(22) Filed: Jul. 3, 2019

(65) Prior Publication Data

US 2019/0380537 A1    Dec. 19, 2019

Related U.S. Application Data

(63) Continuation of application No. 15/624,276, filed on Jun. 15, 2017, now Pat. No. 10,383,481.

(30) Foreign Application Priority Data

Apr. 26, 2017    (KR) .................. 10-2017-0053937

(51) Int. Cl.
*A47J 43/046*    (2006.01)
*A47J 43/07*    (2006.01)
*B02C 25/00*    (2006.01)

(52) U.S. Cl.
CPC ......... *A47J 43/046* (2013.01); *A47J 43/0716* (2013.01); *A47J 43/0727* (2013.01);
(Continued)

(58) Field of Classification Search
CPC .. A47J 43/046; A47J 43/0716; A47J 43/0727; A47J 43/0761; A47J 43/085;
(Continued)

(56) References Cited

U.S. PATENT DOCUMENTS 4,111,372 A    9/1978    Hicks et al.
4,892,413 A    1/1990    Vats
(Continued)

FOREIGN PATENT DOCUMENTS

CN    201101393 Y    8/2008
CN    106037525 A  * 10/2016
(Continued)

OTHER PUBLICATIONS

Japanese Office Action dated Aug. 6, 2019, for Japanese Application No. 2018-534577, 12 pages. (w/English translation).
(Continued)

*Primary Examiner* — Adam J Eiseman
*Assistant Examiner* — Matthew Stephens
(74) *Attorney, Agent, or Firm* — Seed IP Law Group LLP

(57) ABSTRACT

Disclosed is a blender including a noise blocking device. The blender includes: a container receiving food therein and having a processing member in which a processing member for processing food accommodated in the container is rotatably mounted thereon; a handle connected to the container; a body configured to allow the container to be mounted on an upper side thereof and receiving a drive device for supplying drive force for rotation of the processing member; and a noise blocking device connected to the body to define a closed space for receiving the container, wherein the handle is disposed outside the noise blocking device. The blender has a compact and simple structure, and provides user convenience. The noise blocking device of the blender can have an improved noise blocking effect.

7 Claims, 15 Drawing Sheets

(52) U.S. Cl.
CPC ........... *A47J 43/0772* (2013.01); *B02C 25/00* (2013.01); *A47J 43/0722* (2013.01)

(58) Field of Classification Search
CPC ............ B65D 23/0885; B65D 81/3876; A47G 19/2288; A47G 23/0216
See application file for complete search history.

(56) References Cited

U.S. PATENT DOCUMENTS

| | | | |
|---|---|---|---|
| 5,957,577 A | 9/1999 | Dickson et al. | |
| 6,571,908 B2 | 6/2003 | Bohannon et al. | |
| 6,776,086 B1 | 8/2004 | Chang Chien | |
| D556,506 S | 12/2007 | Spagnolo | |
| 8,087,603 B2 | 1/2012 | Kolar et al. | |
| 8,287,180 B2 * | 10/2012 | Kolar | A47J 43/0716 |
| | | | 366/347 |
| 8,752,481 B2 | 6/2014 | Williams et al. | |
| 2006/0007778 A1 | 1/2006 | Tai | |
| 2010/0014380 A1 | 1/2010 | Kolar et al. | |
| 2013/0291645 A1 | 11/2013 | Gammon | |
| 2014/0137750 A1 * | 5/2014 | Arai | A47J 27/004 |
| | | | 99/334 |
| 2014/0217211 A1 | 8/2014 | Sanford | |
| 2015/0044344 A1 | 2/2015 | Choi | |
| 2016/0035335 A1 * | 2/2016 | Kolar | G10K 11/002 |
| | | | 366/347 |
| 2017/0086622 A1 | 3/2017 | Chung | |

FOREIGN PATENT DOCUMENTS

| | | | | |
|---|---|---|---|---|
| CN | 106377181 A * | 2/2017 | | |
| JP | 57-11973 U | 1/1982 | | |
| JP | 2016-73335 A | 5/2016 | | |
| KR | 10-2013-0022839 A | 3/2013 | | |
| KR | 101391972 B1 * | 5/2014 | ............ | A47J 27/004 |
| KR | 10-1631979 B1 | 6/2016 | | |
| KR | 10-2017-0070870 A | 6/2017 | | |
| WO | WO-2014144638 A1 * | 9/2014 | ............ | A47J 43/046 |
| WO | 2015/194750 A1 | 12/2015 | | |

OTHER PUBLICATIONS

Extended European Search Report, dated Feb. 24, 2021, for European Application No. 18731349.9-1004 / 3634189, 8 pages.

* cited by examiner

BLENDER INCLUDING NOISE BLOCKING DEVICE

PRIORITY CLAIM AND CROSS-REFERENCE TO RELATED APPLICATION

This application is a continuation of U.S. patent application Ser. No. 15/624,276, filed on Jun. 15, 2017, which claims priority to and the benefit of Korean Patent Application No. 10-2017-0053937, filed on Apr. 26, 2017, the contents of which are incorporated herein by reference for all purposes as if fully set forth herein.

BACKGROUND

Technical Field

Exemplary embodiments of the present disclosure relate to a blender, and more particularly, to a blender that has a compact and simple structure, provides user convenience, and includes a noise blocking device having an improved noise blocking effect.

Description of the Related Art

Generally, a blender refers to an electronic device for processing (for example, blending and crushing) food. In operation of the blender, rotational force is transferred from a motor disposed inside a blender body to a processing member (for example, a blade), which is rotatably disposed inside a container mounted on an upper side of the blender body, to rotate the processing member at high speed in order to process food in the container.

However, such a blender includes various noise sources. For example, loud noise can be generated due to a mechanism for transferring drive force from the motor to the processing member, or due to collision of food against the processing member and an inner wall of the container within the container. Since such noise is loud enough to obstruct conversation of a user with other persons or pleasant surrounding environments, it is necessary to block noise transfer.

One example of a typical blender enclosure for blocking noise upon operation of a blender is disclosed in Korean Patent No. 10-1631979. This enclosure includes a main body which can be mounted on a base member of a food processer accommodating a motor therein, a cover pivotally coupled to an upper portion of the main body to be lifted upwards, and a handle provided to a lower portion of an outer surface of the cover.

However, since such a typical blender enclosure is configured to receive both a blender container and a handle of the container, the enclosure has a large size and requires a separate handle to open or close the cover. In addition, since the cover constitutes a front part of the enclosure, the cover is heavy. Moreover, since the entire front part of the enclosure is required to be open in order to allow the cover to be open such that a user can grip the handle of the container, a separated line between the body and the cover is long and noise leaks through this line, thereby deteriorating a noise blocking effect.

BRIEF SUMMARY

Exemplary embodiments of the present disclosure provide a blender that has a compact and simple structure, provides user convenience, and includes a noise blocking device having an improved noise blocking effect.

In accordance with one exemplary embodiment of the present disclosure, a blender for processing food includes: a container in which a processing member for processing food accommodated in the container is rotatably mounted; a handle connected to the container; a body configured to allow the container to be mounted on an upper side thereof and receiving a drive device for supplying drive force for rotation of the processing member; and a noise blocking device connected to the body to define a closed space for accommodating the container, wherein the handle is disposed outside the noise blocking device.

The noise blocking device may include a lower blocking wall connected to the upper side of the body and open at an upper end thereof, and an upper blocking wall pivotally connected to an upper portion of the lower blocking wall to open or close the open upper end of the lower blocking wall.

The upper blocking wall may be formed at a lower portion thereof with a handle exposing groove allowing the handle to extend outside the noise blocking device therethrough.

The handle may include a handle attachment portion directly connected to the container and a grip portion extending downwards from the handle attachment portion, and the handle attachment portion may engage with the handle exposing groove when the upper blocking wall is closed.

The handle exposing groove may be provided with a sealing member.

The body may include a connection protrusion protruding upwards from the upper surface thereof, so that the lower blocking wall surrounds an outer surface of the connection protrusion.

The container may be provided at a lower portion thereof with a mounting portion inserted into the connection protrusion to adjoin an inner surface of the connection protrusion.

The blender may further include an exhaust device. The exhaust device may include a vacuum pump provided to the body, a suction unit provided to the upper blocking wall, and an exhaust line connecting the vacuum pump and the suction unit.

The blender may further include a hinge coupled to the upper blocking wall to allow the upper blocking wall to rotate thereon, and a hinge column extending from the body in a longitudinal direction and connected to the hinge, and the exhaust line may extend through the hinge column.

The exhaust line may be divided into two portions and a coupling member may be provided to each of ends of the two portions facing each other to connect the two portions to each other when the upper blocking wall is closed and to separate the two portions from each other when the upper blocking wall is open.

The upper blocking wall may be provided with a pressure gauge. The pressure gauge may include a cylinder member fluidly communicating with the exhaust line, a piston member slidably disposed inside the cylinder member, and a restoration member capable of applying restoration force to the piston member.

The blender may further include: a detection unit and a first detection target provided to the upper blocking wall and the lower blocking wall or to surroundings thereof to be brought into contact with each other or to be separated from each other upon closing or opening of the upper blocking wall, and the drive device may be rotated when the detection unit is brought into contact with the first detection target, and rotation of the drive device may be stopped when the detection unit is separated from the first detection target.

The blender may further include: a socket hinged to a lid to open or close a push rod insertion hole formed in the lid; and a second detection target provided to the socket. Here, the second detection target may be provided to the socket and brought into contact with the detection unit so as to allow rotation of the drive device when the socket is open.

The lower blocking wall may be detachably connected to the body.

The noise blocking device may include a noise blocking wall including a single member having a hollow column shape open at a lower end thereof and closed at an upper end thereof, and the handle may be connected to a lower portion of the container and extend upwards.

The body may be formed on the upper side thereof with a connection protrusion to which the open lower end of the noise blocking wall is connected so as to surround an outer surface of the connection protrusion.

The container may be provided at the lower portion thereof with a mounting portion inserted into the connection protrusion to adjoin an inner surface of the connection protrusion.

The connection protrusion may be formed with a handle exposing groove allowing the handle to extend outside the noise blocking wall therethrough.

The noise blocking wall may be formed at a lower end thereof with a handle exposing groove allowing the handle to extend therethrough.

The blender may further include an exhaust device. The exhaust device may include a vacuum pump provided to the body, a suction unit provided to an upper portion of the noise blocking wall, and an exhaust line for connecting the vacuum pump to the suction unit.

BRIEF DESCRIPTION OF DRAWINGS

The above and other aspects, features and advantages of the present disclosure will become apparent from the following description of embodiments given in conjunction with the accompanying drawings, in which.

DETAILED DESCRIPTION

Hereinafter, exemplary embodiments of the present disclosure will be described in detail with reference to the accompanying drawings.

Exemplary Embodiment 1

First, a blender including a noise blocking device according to a first exemplary embodiment and modifications thereof will be described with reference to FIG. 1 to FIG. 10.

Figure 1:
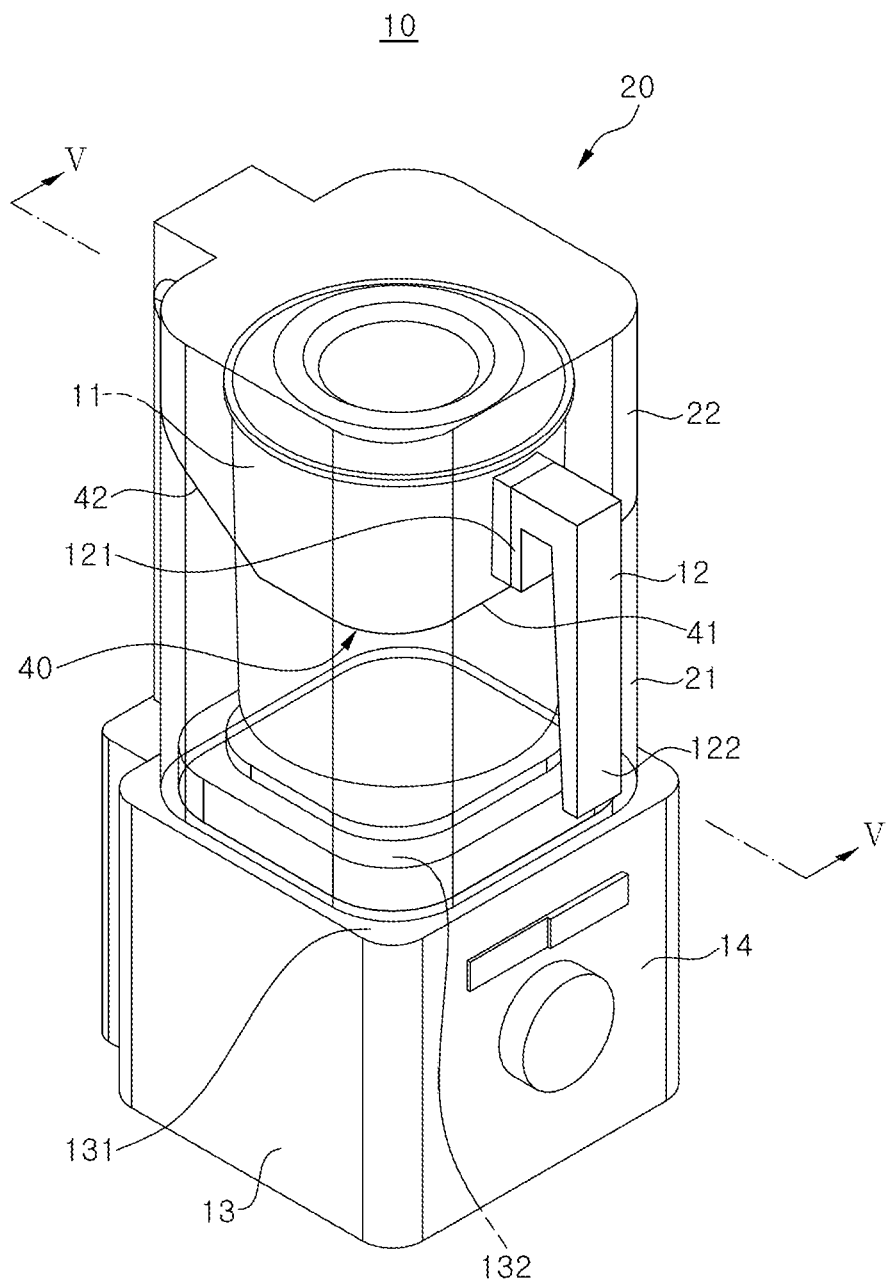
FIG. 1 is a perspective view of a blender according to a first exemplary embodiment of the present disclosure.
Figure 2:
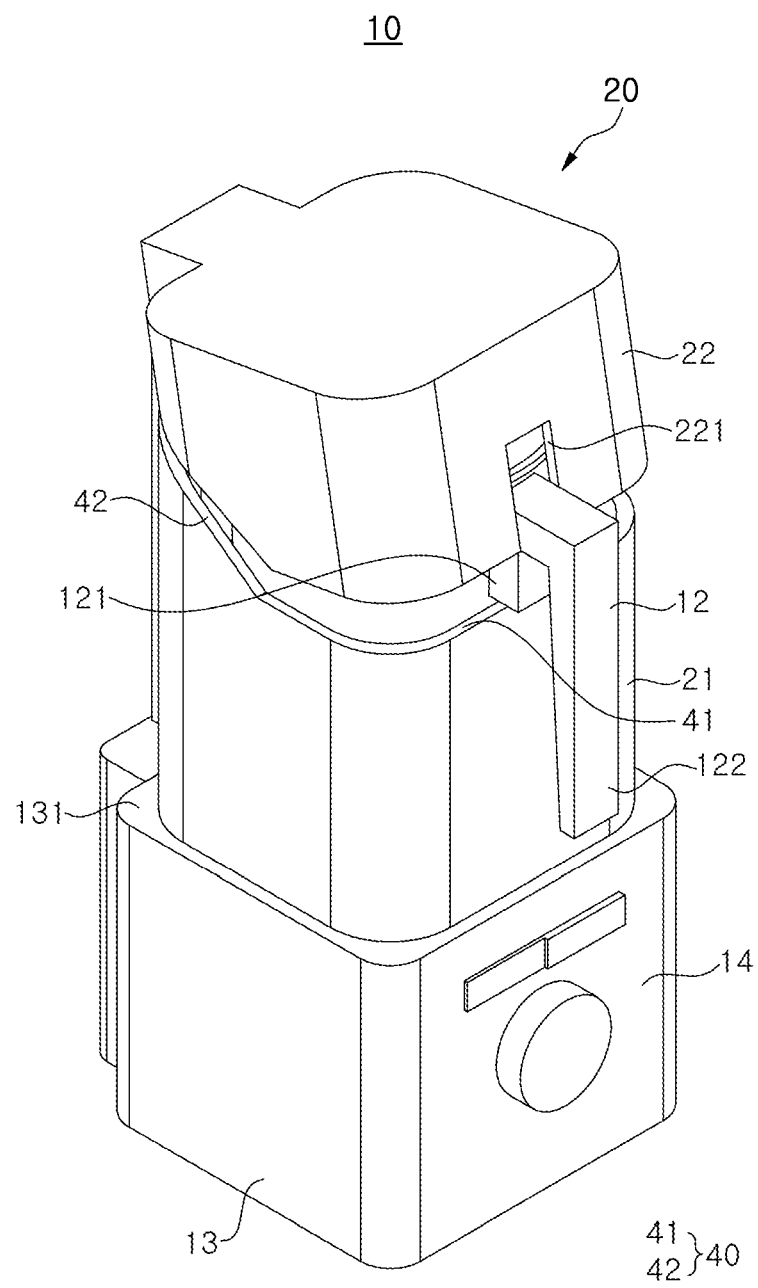
FIG. 2 is a perspective view of the blender of FIG. 1, with an upper blocking wall slightly open.
Figure 3:
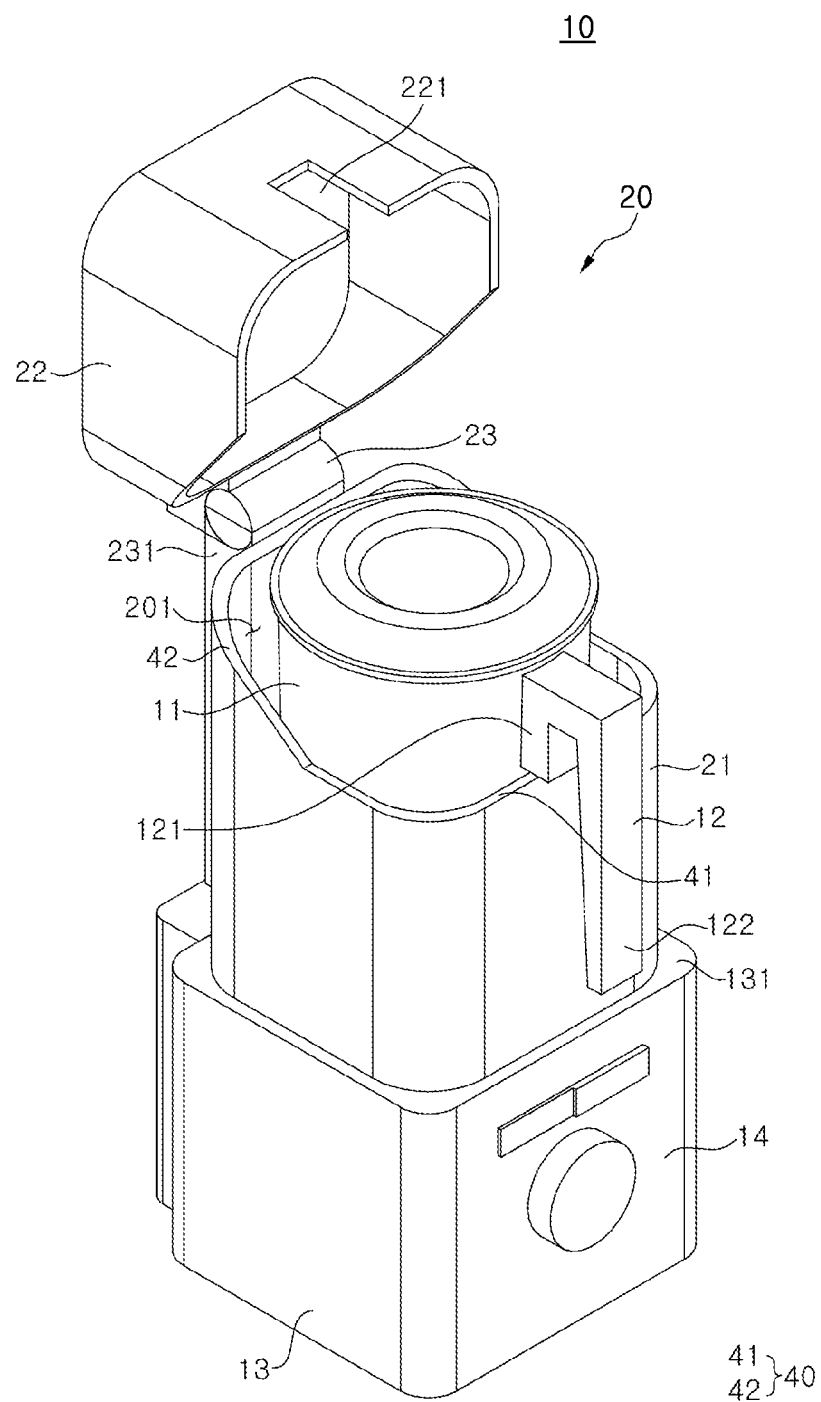
FIG. 3 is a perspective view of the blender of FIG. 1, with the upper blocking wall further open than the upper blocking wall of FIG. 2 such that an upper portion of a container is completely open.
Figure 4:
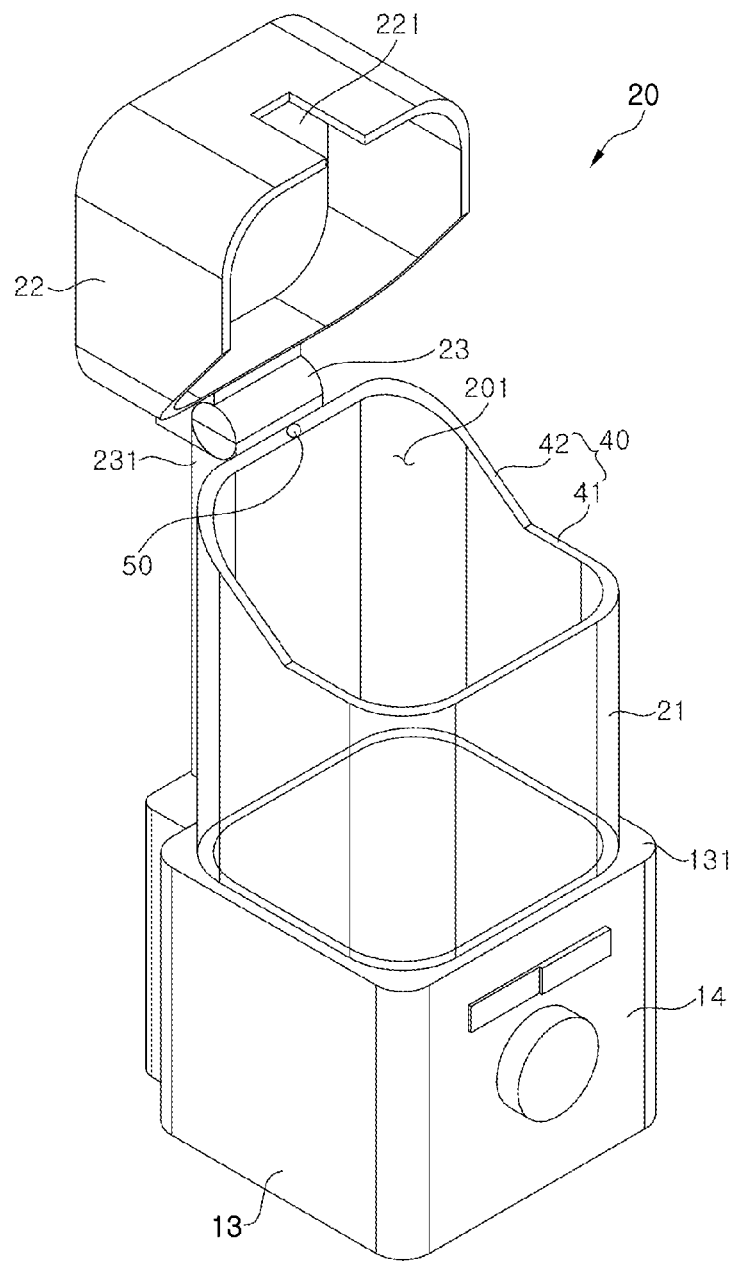
FIG. 4 is a perspective view of the blender shown in FIG. 1, from which the container is removed.
Figure 5:
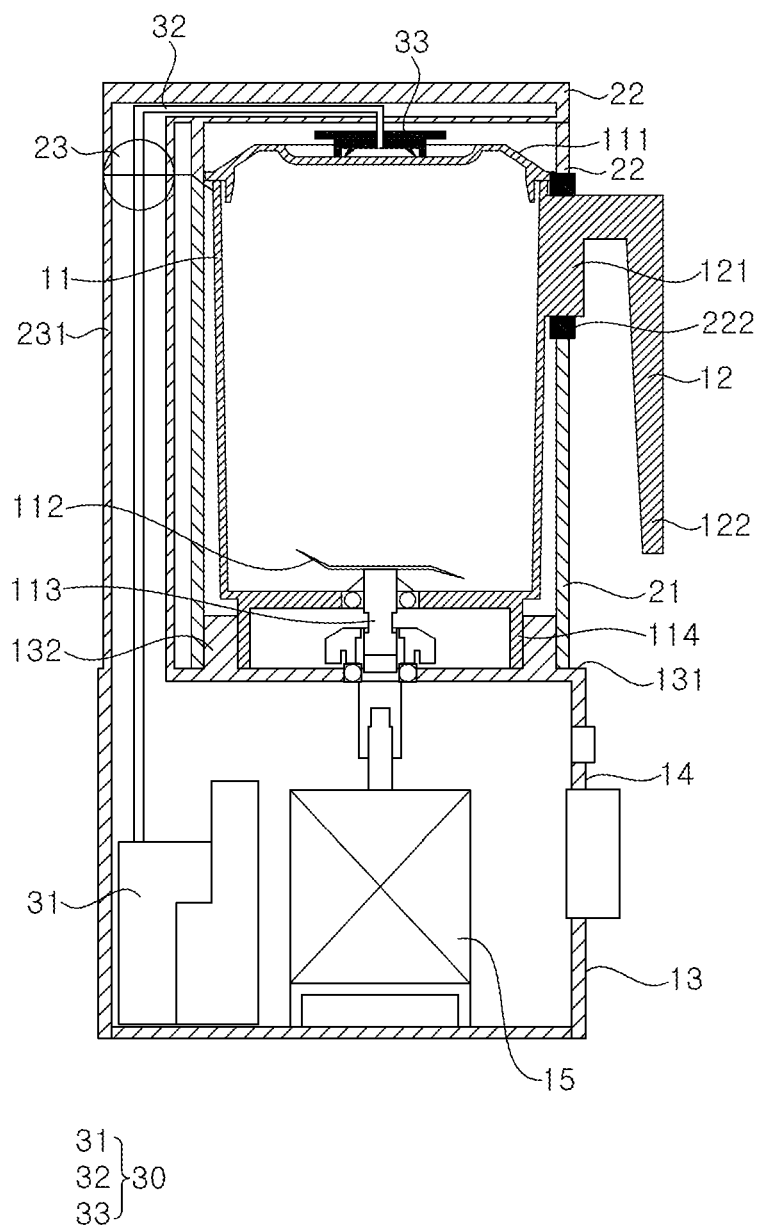
FIG. 5 is a cross-sectional view taken along line V-V of FIG. 1, showing a modification of the blender of FIG. 1.
Figure 6:
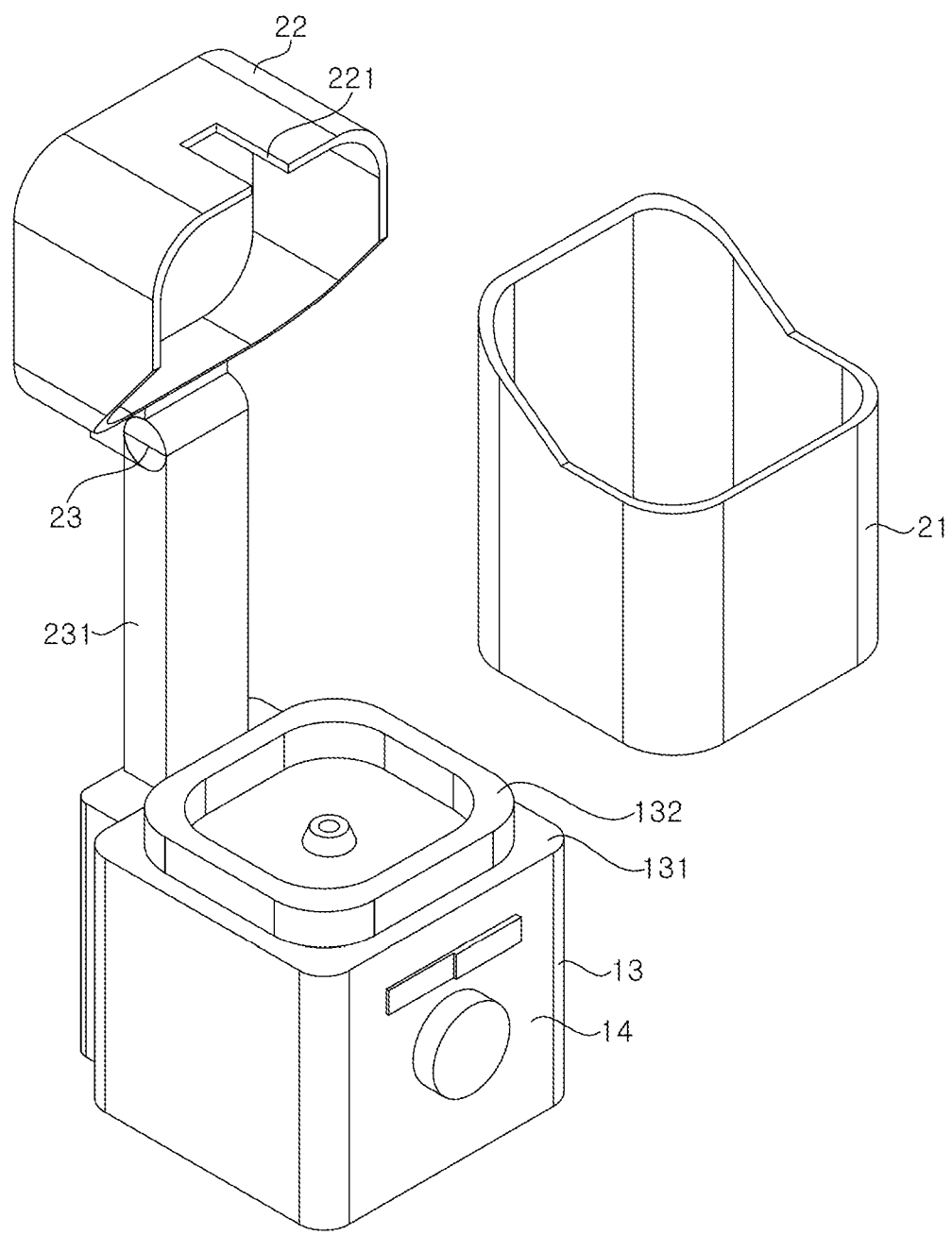
FIG. 6 is an exploded perspective view of another modification of the blender according to the first exemplary embodiment of the present disclosure.
Figure 7:
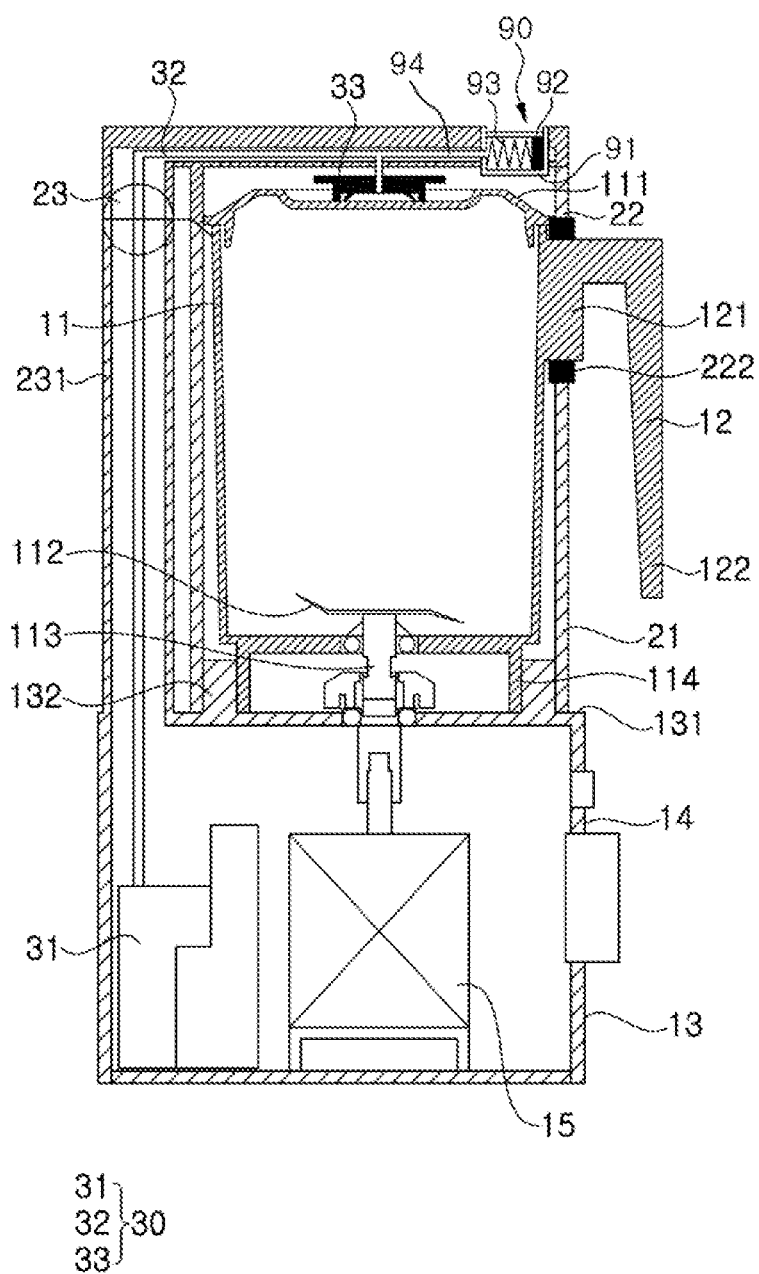
FIG. 7 is a cross-sectional view of another modification of the blender according to the first exemplary embodiment of the present disclosure.
Figure 8:
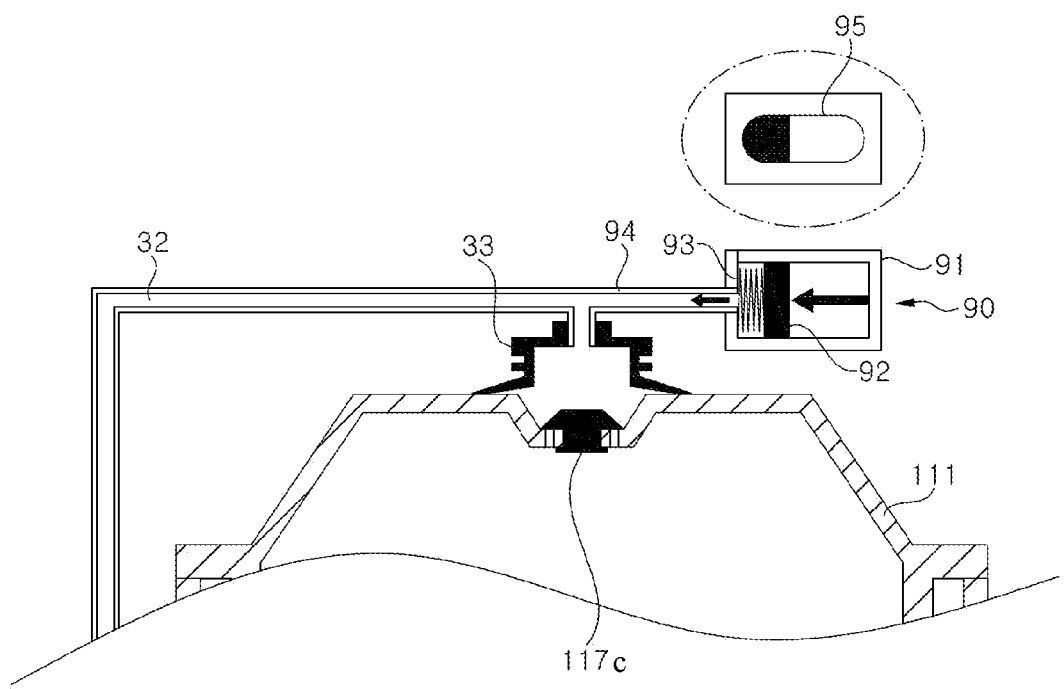
FIG. 8 is a partial cross-sectional view of the blender of FIG. 7 showing an operation principle of a pressure gauge of the blender.
Figure 9:
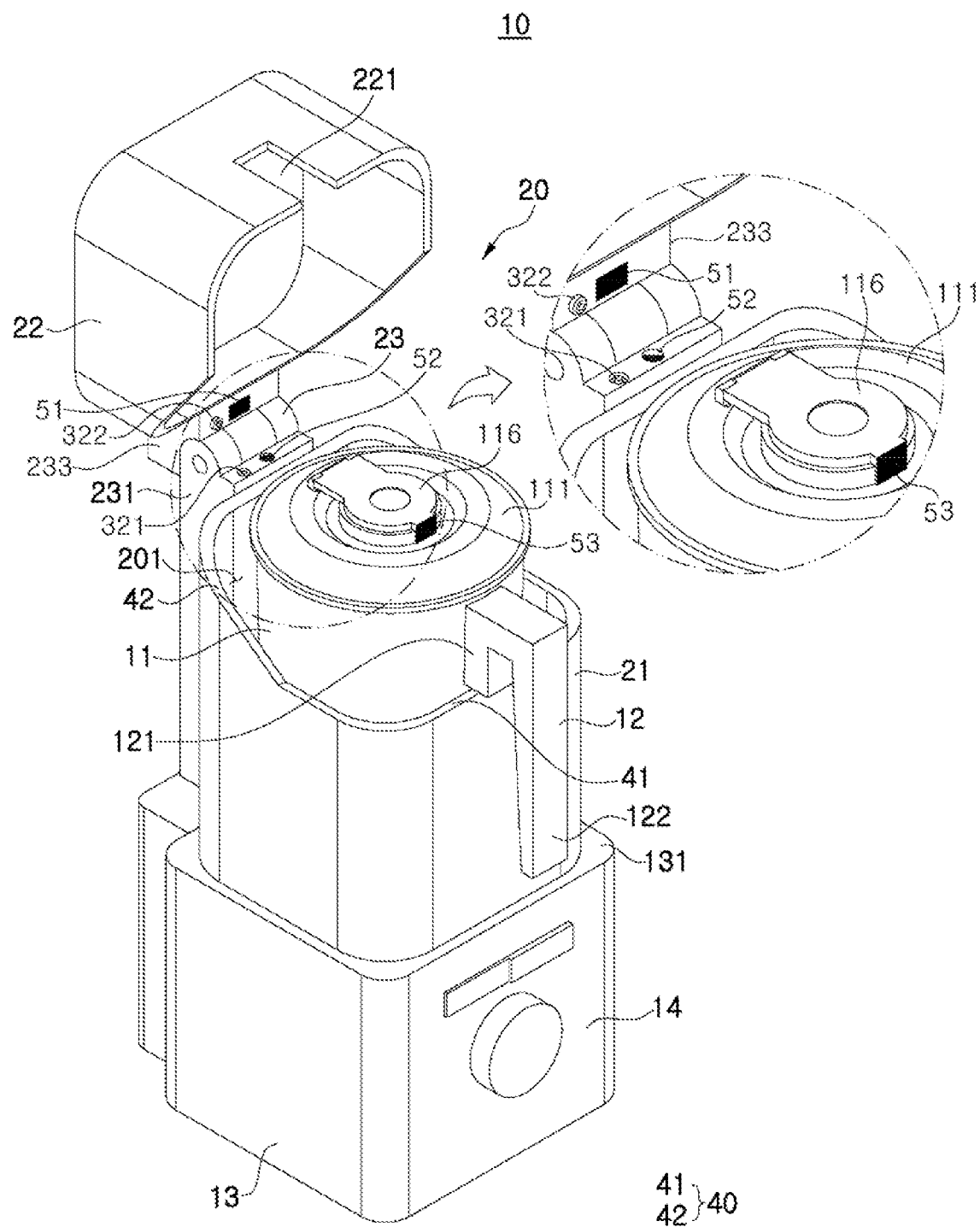
FIG. 9 is a perspective view of a further modification of the blender according to the first exemplary embodiment of the present disclosure.
Figure 10:
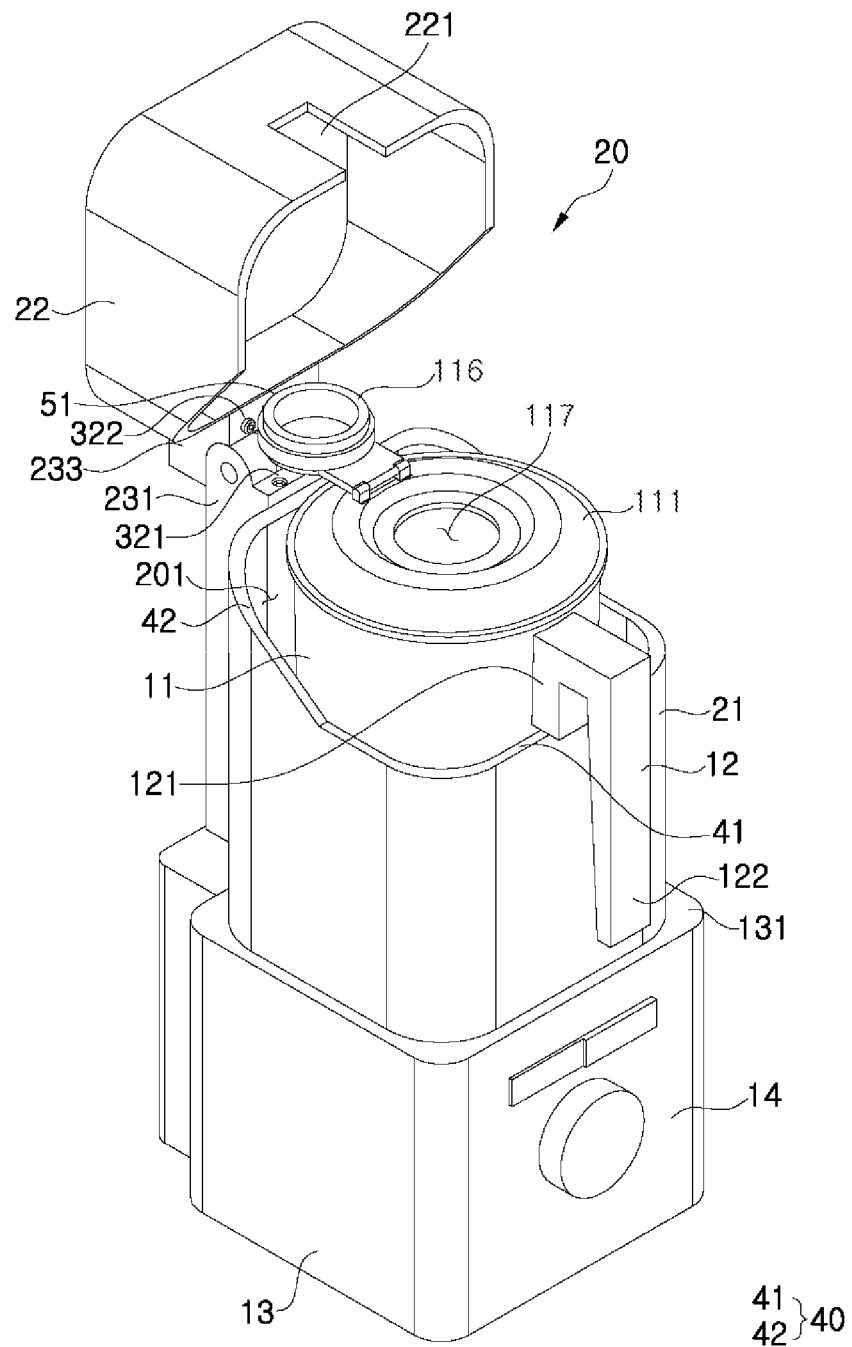
FIG. 10 is a perspective view of the blender of FIG. 9, with a socket open.

FIG. 1 is a perspective view of a blender according to a first exemplary embodiment of the present disclosure, FIG. 2 is a perspective view of the blender shown in FIG. 1, with an upper blocking wall slightly opened, FIG. 3 is a perspective view of the blender of FIG. 1, with the upper blocking wall further opened than the upper blocking wall of FIG. 2 such that an upper portion of a container is completely exposed, FIG. 4 is a perspective view of the blender shown in FIG. 1, from which the container is removed, FIG. 5 is a cross-sectional view of a modification taken along line V-V of FIG. 1, showing modification of the blender of FIG. 1, FIG. 6 is an exploded perspective view of another modification of the blender according to the first exemplary embodiment of the present disclosure, FIG. 7 and FIG. 8 are a cross-sectional view and a partial cross-sectional view of another modification of the blender according to the first exemplary embodiment of the present disclosure, showing an operation principle of a pressure gauge of the blender, respectively, and FIG. 9 and FIG. 10 are perspective views of a further modification of the blender according to the first exemplary embodiment of the present disclosure, respectively.

A blender 10 according to the first exemplary embodiment of the present disclosure includes: a container 11 configured to receive food therein; a handle 12 attached to one side of the container 11 such that a user can grip the handle 12; a body 13 configured to allow the container 11 to be mounted on an upper side thereof and receiving a drive device 15 for supplying drive force to a processing member 112 rotatably mounted on the container 11 to be exposed inside the container 11; and a noise blocking device 20 accommodating the container 11 in a closed space defined together with the body 13 to block noise generated from the container 11 and a space between the container 11 and the body 13 during operation of the blender 10. On the other hand, the noise blocking device 20 is configured to surround the container 11, but allow the handle 12 attached to one side of the container 11 to be disposed outside the noise blocking device 20. In addition, as shown in FIG. 5, the blender 10 according to one modification of the present disclosure may further include an exhaust device generally identified by reference number 30 that discharges air from the inside of the container 11.

The container 11 is formed at an upper portion thereof with an opening through which food is input for processing, and includes a lid 111 that opens or closes the opening and the processing member 112 configured to process the food received in the container. The container 11 may be mounted on a seat formed on an upper surface 131 of the body 13, whereby the processing member 112 can receive drive force from the drive device 15 in the body 13 through a rotational force transfer mechanism including a drive shaft, a gear and the like.

The handle 12 attached to one side of the container 11 includes an attachment portion 121 directly connected to the container 11 and a grip portion 122 gripped by a user. The attachment portion 121 protrudes from the container 11 to engage with a handle exposing groove 221 (see FIG. 2) when an upper blocking wall 22 of the noise blocking device 20 described below is closed. As such, when the attachment portion 121 engages with the handle exposing groove 221, noise, which otherwise would leak through the handle exposing groove 221, can be more effectively blocked.

Although the attachment portion 121 is illustrated as having a parallelepiped shape, it should be understood that other implementations are also possible. The shape of the attachment portion 121 may vary corresponding to the shape of the handle exposing groove 221. In addition, the attachment portion 121 may be stepped in a lateral direction. That is, a portion of the attachment portion 121 closer to the container 11 may have a greater width than the handle exposing groove 221, or vice versa.

In FIG. 1 to FIG. 7, the attachment portion 121 may be inserted only into the handle exposing groove 221 of the upper blocking wall 22. However, it should be understood that other implementations are also possible. For example, in other exemplary embodiments, the handle exposing groove (not shown) may be formed on a lower blocking wall 21 such that the entirety or a lower portion of the attachment portion 121 extends through the handle exposing groove of the lower blocking wall 21 or engages therewith.

In addition, the attachment portion 121 is formed at a lower side thereof with a groove extending from the lower side thereof to an upper side thereof such that, when the container 11 is mounted on the seat of the body 13, a portion of an upper end of the lower blocking wall 21 can be inserted into the groove.

The grip portion 122 of the handle 12 may be provided with a portion extending from the attachment portion 121 in a lateral direction and a portion extending downwards therefrom. A gap can be formed between the portion extending downwards and the lower blocking wall 21, described below, by the portion extending in the lateral direction, such that the hand of a user can be inserted into the gap.

Although the grip portion 122 is illustrated as having a rectangular column in FIG. 1 to FIG. 5, the grip portion is not limited thereto and may have a variety of shapes capable of being gripped by a user. For example, the grip portion 122 may have a ring shape configured to be brought into close contact with the lower blocking wall 21, or may be provided at a lower end thereof with a protrusion that can be brought into close contact with an outer surface of the lower blocking wall 21.

The lid 111 of the container 11 may be detachably mounted on the opening formed at the upper portion of the container 11. Referring to FIG. 5, the lid 11 may be provided at an upper portion thereof with a check valve 117c (see FIG. 8) that can be connected to a suction unit 33 of the exhaust device 30 when the upper blocking wall 22 is closed. In this case, upon operation of a vacuum pump 31 of the exhaust device 30, air can be discharged from the container 11 through the check valve and an exhaust line 32, thereby increasing a vacuum degree inside the container 11. In addition, the suction unit 33 and the check valve 117c may be connected to each other through a gap therebetween via air communication instead of being directly connected to each other. That is, although the suction unit 33 does not adjoin the check valve 117c, the suction unit 33 suctions air surrounding the lid 111 to increase a vacuum of an interior space 201 of the noise blocking device 20, whereby air inside the container 11 can flow outside the container 11 through the check valve to connect the suction unit 33 to the check valve 117c.

Further, the sizes of the container 11 and the lid 111 may be determined such that, when the upper blocking wall 22 is closed as shown in FIG. 1, an upper surface of the lid 111 can be compressed by a lower surface of the upper blocking wall 22 and force compressing the lid 11 can be transferred to the container 11 to suppress vibration of the container 11.

According to one exemplary embodiment, the noise blocking device 20 includes the lower blocking wall 21 air-tightly connected at a lower open end thereof to the upper side of the body 13 of the blender 10 and having a tube shape open at an upper end thereof, and the upper blocking wall 22 rotatably connected to the lower blocking wall 21 to open or close an upper opening of the lower blocking wall 21 and having a tube shape open at a lower end thereof and closed at an upper end thereof. The lower blocking wall 21 surrounds at least a lower portion of the container 11 when the container 11 is received in the interior space 201, and the upper blocking wall 22 surrounds the remaining portion of the container 11 surrounded by the lower blocking wall 21.

The lower blocking wall 21 and the upper blocking wall 22 of the noise blocking device 20 may be formed of a transparent material and may have a double-wall structure.

The noise blocking device 20 is formed with the handle exposing groove 221, through which the handle 12 of the container 11 extends outside the noise blocking device 20, as described above. As such, since the handle 12 of the container 11 is disposed outside the noise blocking device 20, the noise blocking device 20 can be formed in a smaller, more compact structure. In addition, since the handle 12 of the container 11 is exposed outside the noise blocking device 20, a portion at which the upper blocking wall 22 and the lower blocking wall 21 are separated, that is, a separation line generally identified by reference number 40, particularly, a front separation line 41 can be placed at a higher location to allow a rear separation line 42 to also be at a high location, thereby enabling size reduction of the upper blocking wall 22. With this structure, the upper blocking wall 22 can be more easily opened or closed by a user (with small force) and the separation line 40 is disposed farther from a noise generation location, thereby reducing noise leakage through the separation line 40.

In addition, since the handle 12 of the container 11 is exposed outside the noise blocking device 20 as described above, the upper blocking wall 22 can be opened by gripping the handle 12 of the container 11 and lifting the container 11 when a user removes the container 11 from the noise blocking device 20. Accordingly, the blender according to this exemplary embodiment does not require a separate handle for opening the upper blocking wall 22, whereby the noise blocking device 20 can have a simpler configuration.

As described above, although the handle exposing groove 221 of the noise blocking device 20 may be provided to the upper blocking wall 22 as shown in FIG. 1 to FIG. 7, the handle exposing groove 221 may also be provided to the lower blocking wall 21 or to both the upper and lower blocking walls.

As shown in FIG. 5, the upper blocking wall 22 may be provided with a sealing member, for example, a packing 222, at an edge thereof, at which the handle exposing groove 221 is formed, in order to suppress noise leakage by improving air tightness. Furthermore, sealing members may also be provided to three sides of the handle exposing groove 221 formed on the upper blocking wall 22 and an upper end of the lower blocking wall 21 corresponding to the handle exposing groove 221.

As shown in the drawings, the noise blocking device 20 may be provided at a rear side thereof with a hinge column 231 extending from the body 13 in the longitudinal direction. In this structure, a lower portion of a hinge 23 may be connected to an upper end of the hinge column 231. The hinge 23 may be connected at an upper side thereof to the upper blocking wall 22 and at one portion of a lower side thereof to the lower blocking wall 21. However, as described below, when the lower blocking wall 21 is detachable from the body 13 (see FIG. 6), the hinge 23 may not be connected to the lower blocking wall 21.

Further, as shown in FIG. 5, the hinge column 231 may be formed therein with the exhaust line 32, which fluidly connects the vacuum pump 31 inside the body 13 with the suction unit 33 of the upper blocking wall 22.

The hinge column 231 may further include an upper portion 233 (See, FIG. 9) disposed on the upper portion of the hinge 23 and connected to the upper blocking wall 22. The exhaust line 32 may extend through the hinge column 231 and the upper portion 233. Further, for example, as shown in FIG. 9 and FIG. 10, the exhaust line 32 may be divided when the upper blocking wall 22 is open. In this structure, in order to allow a portion of the exhaust line 32 provided to the upper blocking wall 22 and a portion of the exhaust line 32 provided to the hinge column 231 to be easily separated from each other or to be air-tightly coupled to each other, for example, male-female coupling members 321, 322 may be provided to an upper end of the hinge column 231 and the upper portion 233, respectively.

With this structure, when the handle 12 of the container 11 is lifted in order to remove the container 11 from the noise blocking device 20, the upper blocking wall 22 is opened to release a connection state of the exhaust line 32 at the coupling members 321, 322 such that a vacuum created between the suction unit 33 and the lid 111 of the container 11 can be released, thereby facilitating an operation of removing the container 11 from the blender.

The lower blocking wall 21 may be air-tightly secured or detachably connected to an upper surface 131 of the body 13. Particularly, as shown in FIG. 6, in the structure wherein the lower blocking wall 21 is detachably connected to the upper surface 131 of the body 13, a connection protrusion 132 may be formed on the upper surface 131 of the body 13. The connection protrusion 132 may protrude to a predetermined height from the upper surface 131 and may be formed in a closed curve shape or in an intermittently open curve shape in plan view. An inner surface of the lower blocking wall 21 is brought into close contact with a lateral outer surface of the connection protrusion 132, whereby the lower blocking wall 21 can be connected to the connection protrusion 132. With this detachable structure, the lower blocking wall can be detachable from the body, thereby allowing an easy cleaning operation of the lower blocking wall. Furthermore, when the lower blocking wall is removed from the body, an upper portion of the body can be easily cleaned.

In addition, the container 11 is formed at a lower surface thereof with a mounting portion 114 and can be mounted on the body when the mounting portion 114 of the container 11 is brought into close contact with a lateral inner surface of the connection protrusion 132.

In the blender with this structure, noise generated from a connection portion between the drive device 15 and the rotational shaft 113 of the container 11 can be blocked by triple walls, that is, the mounting portion 114 of the container 11, the connection protrusion 132 and the lower portion of the lower blocking wall 21, thereby improving the noise blocking effect.

As described above, the upper blocking wall 22 may be rotatably connected to the lower blocking wall 21 via the hinge 23 and may adjoin the upper end of the lower blocking wall 21 at the separation line 40. In addition, the upper blocking wall 22 may be dimensioned to surround an outer surface of the upper end of the lower blocking wall 21 at the separation line 40, or to be inserted into the lower blocking wall 21 such that the upper blocking wall 22 can contact an inner surface of the upper end of the lower blocking wall 21. The separation line 40 may be provided with a sealing member, for example, a packing (not shown), to effectively reduce leakage of noise through the separation line 40.

The noise blocking device 20 may be dimensioned to form a gap between an outer surface of the container 11 and an inner surface of the noise blocking device 20, with the container 11 received in the noise blocking device 20.

Referring to FIG. 4, the blender 10 may further include a drive stop switch 50 disposed on the upper end of the lower blocking wall 21. The drive stop switch 50 is compressed by the upper blocking wall 22 to allow rotation of the drive device 15 when the upper blocking wall 22 is closed, and is released from a compressed state to stop or prevent rotation of the drive device 15 when the upper blocking wall 22 is open. With this structure, the drive stop switch 50 may be operated in a safe mode in which safety of the blender 10 can be improved. Furthermore, when the upper blocking wall 22 is opened by lifting the container 11 in order to separate the container 11 from the noise blocking device 20, rotation of the drive device 15 can be stopped, thereby improving user convenience.

Furthermore, as shown in FIG. 9, in order to operate the blender 10 in the aforementioned safe mode, the blender 10 may further include a detection unit 51 configured to allow a circuit of the detection unit 51 to be opened or closed in response to opening or closing of the upper blocking wall 22, and a first detection target 52. For example, the first detection target 52 may be realized by a magnet disposed on the upper end of the hinge column 231 or by a reed switch disposed on the upper portion 233 such that the first detection target 52 can actually contact the detection unit 51 when the upper blocking wall 22 is closed. Thus, when the upper blocking wall 22 is closed to allow the first detection target 52 to actually contact the detection unit 51, the circuit of the detection unit 51 is closed to allow rotation of the drive device 15, and when the upper blocking wall 22 is opened to allow the first detection target 52 to be separated from the detection unit 51, the circuit of the detection unit 51 is open to stop or prevent rotation of the drive device 15 or be converted to a state in which the drive device 51 is not possible to rotate.

As shown in FIG. 9 and FIG. 10, the blender 10 may further include a second detection target 53, which is provided to a socket 116 hinged to the lid 11 so as to open or close a push rod insertion hole 117 formed in the lid 111 of the container 11. The second detection target 53 may be disposed on the socket 116 in such a manner that it comes into contact with the detection unit 51 when the socket 116 is opened so as to open the push rod insertion hole 117. For example, the second detection target 53 is realized by a magnet such that, when the socket 116 is opened to cause the second detection target 53 to contact the detection unit 51, the circuit of the detection unit 51, which has been opened by opening the upper blocking wall 22 can be closed again. Accordingly, when the socket 116 is completely opened in order to compress food against the processing member 112 in the container 11 using a push rod (not shown), the circuit of the detection unit 51 is closed to allow the drive device 15 to be rotated or rotatable again.

FIG. 7 is a cross-sectional view of another modification of the blender according to the first exemplary embodiment of the present disclosure. The blender according to this modification further includes a pressure gauge 90 which is provided in order to display a vacuum pressure of the exhaust device to a user.

The pressure gauge 90 may be provided to the upper blocking wall 22. The pressure gauge 90 includes a gauge connection line 94 extending from the exhaust pipe 32 of the exhaust device 30, a cylinder member 91 connected to the gauge connection line 94 and to which suction force is delivered, a piston member 92 slidably disposed inside the cylinder member 91, and a restoration member 93 applying restoration force to the piston member 92 so as to restore the piston member 92 to an original location. A portion of the cylinder member 91 is composed of a transparent member 95 (indicated in a dash-dot line circle in FIG. 8) such that the piston member 92 (or an indicator (not shown) connected to the piston member 92) sliding inside the cylinder member 91 can be visible from the outside. Further, the cylinder member 91 may be formed with a hole (not shown) through which an interior space defined by the cylinder member 91 and the piston member 91 communicates with an exterior space to facilitate sliding movement of the piston member 91.

Referring to FIG. 8, operation of the pressure gauge 90 will be described. The dash-dot line circle in FIG. 8 is a top view of the cylinder member 91 viewed from above the upper blocking wall. Upon operation of the vacuum pump 31 of the blender 10, suction force is generated in the exhaust line 32 and is applied to the suction unit 33 while being applied to the interior of the cylinder member 91 through the gauge connection line 94. As a result, air is discharged from the cylinder member 91 to cause the piston member 92 to move to the left in the drawing. Then, the restoration member 93 is compressed to generate restoration force. As such, since the piston member 92 is moved further leftwards with increasing vacuum degree of the cylinder member 91, a user can determine the vacuum degree of the container 11 from a location of the piston member 92 viewed through the transparent member 95.

Exemplary Embodiment 2

Next, a blender including a noise blocking device according to a second exemplary embodiment and its modifications will be described with reference to FIG. 11 to FIG. 15.

Figure 11:
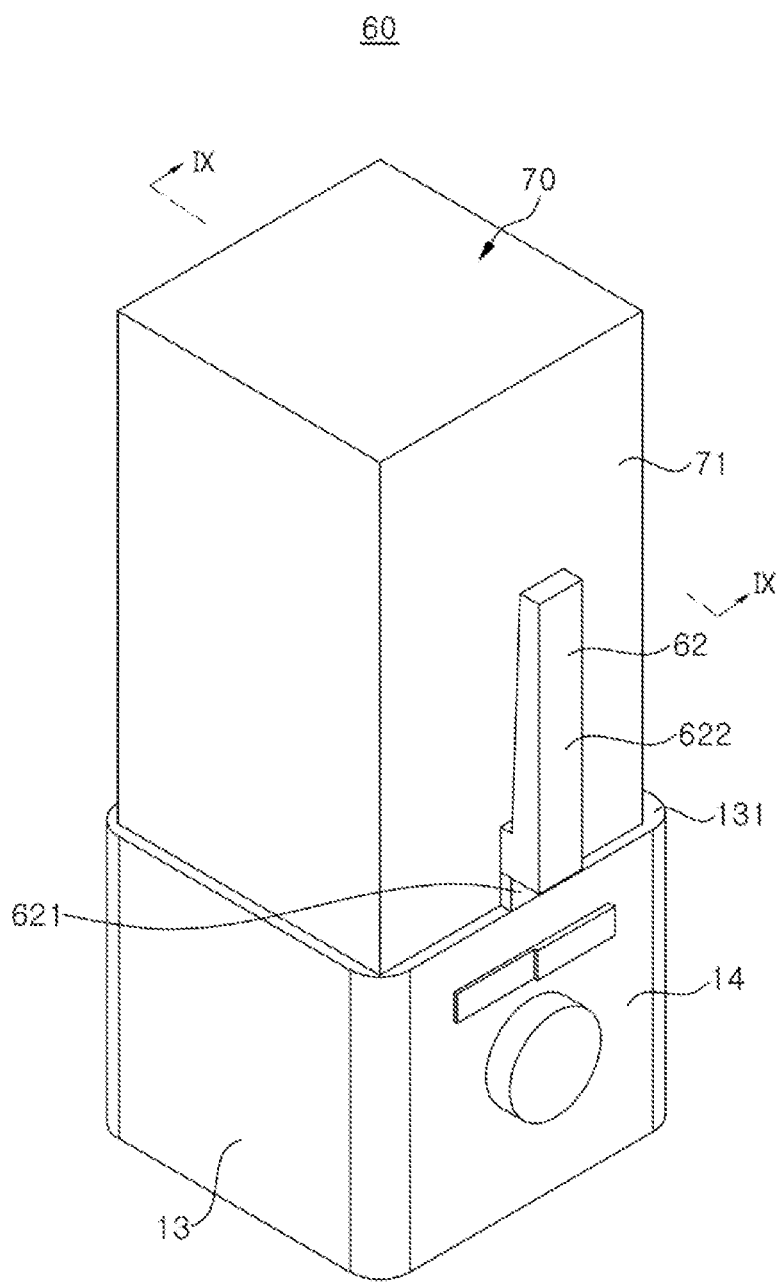
FIG. 11 is a perspective view of a blender according to a second exemplary embodiment of the present disclosure.
Figure 12:
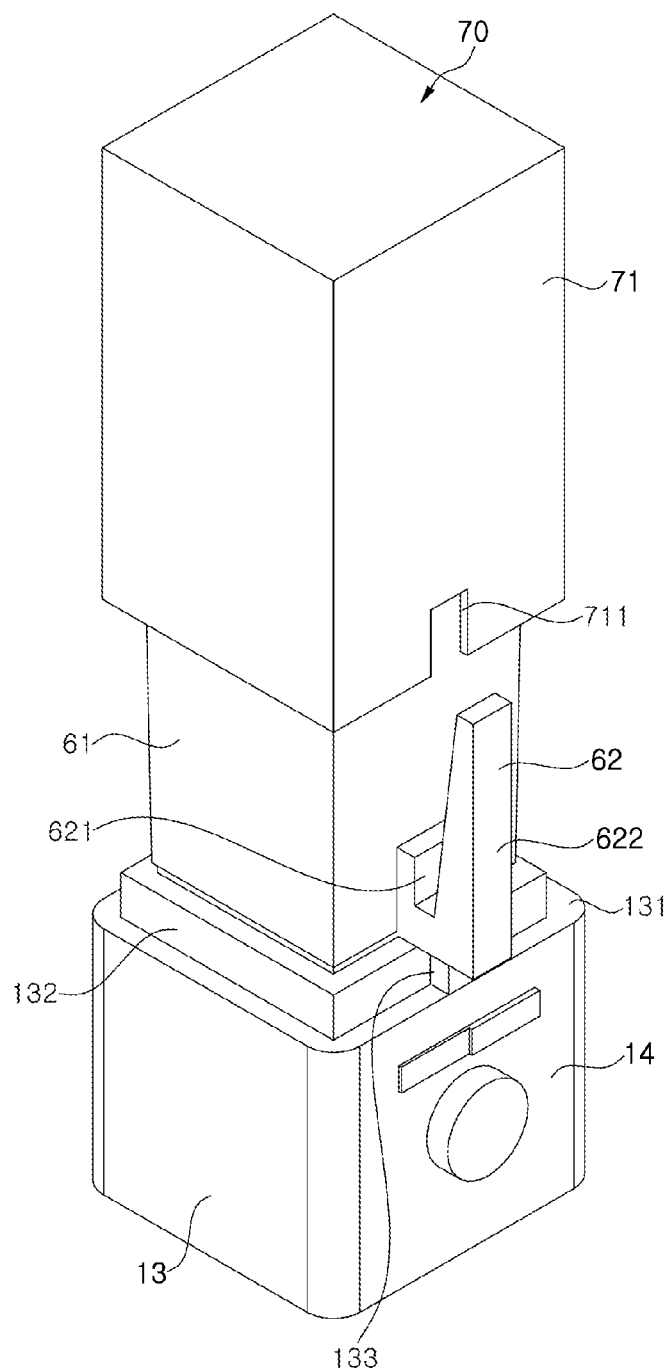
FIG. 12 is a perspective view of the blender of FIG. 11, with a noise blocking device partially open.
Figure 13:
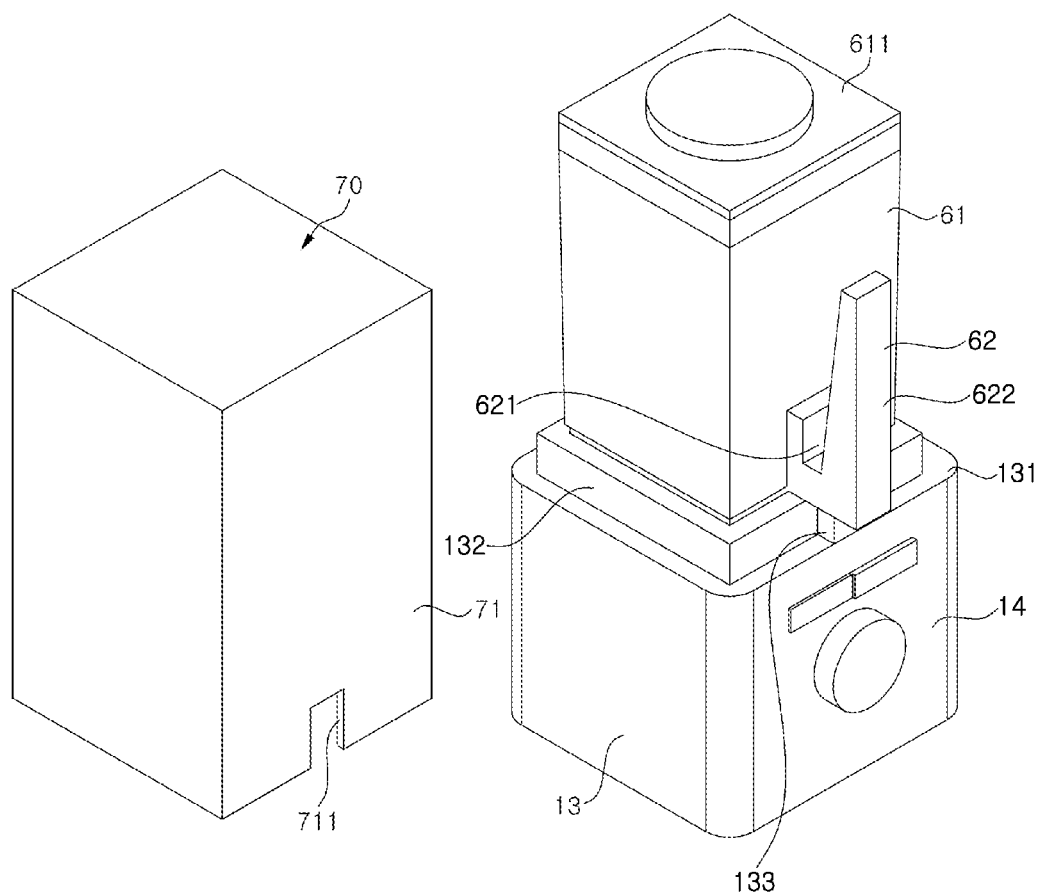
FIG. 13 is a perspective view of the blender of FIG. 11, from which the noise blocking device is completely removed.
Figure 14:
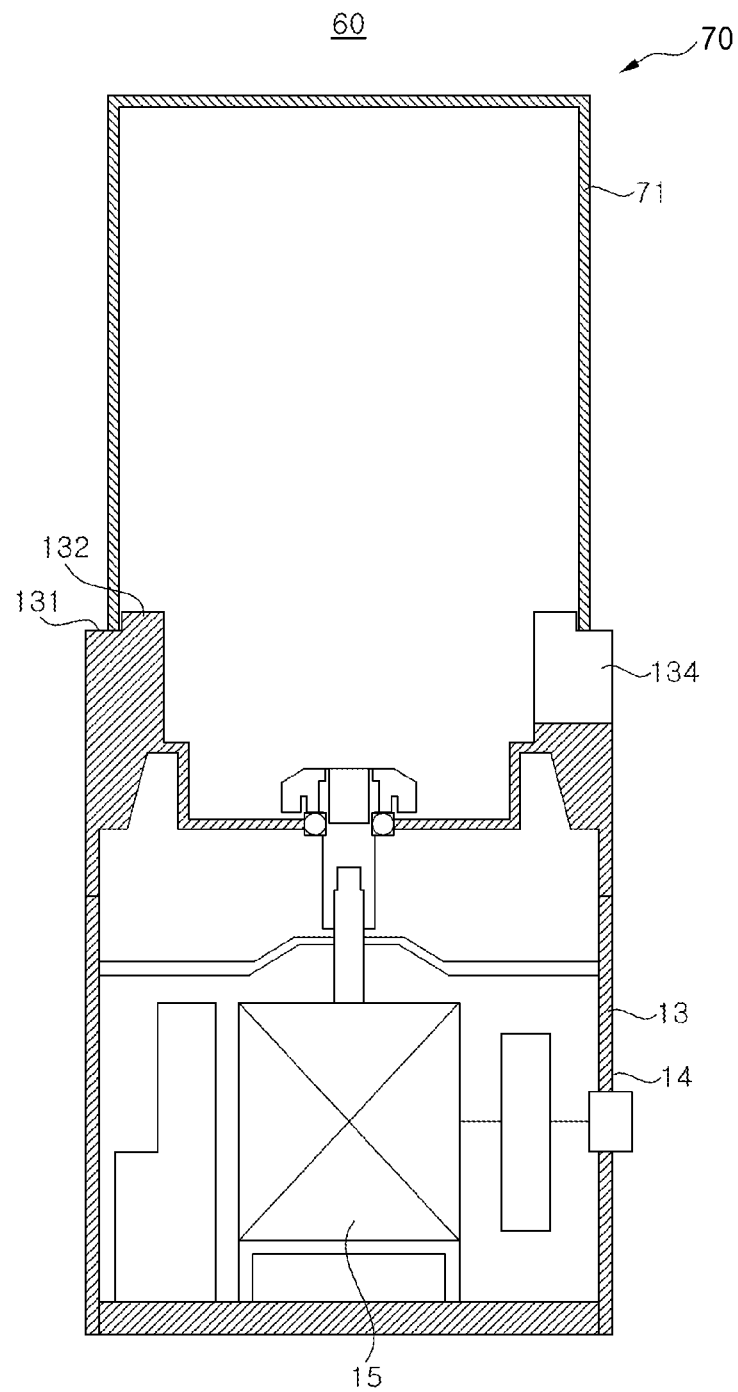
FIG. 14 and FIG. 15 are cross-sectional views taken along line IX-IX of FIG. 11, showing another modification of the blender.
Figure 15:
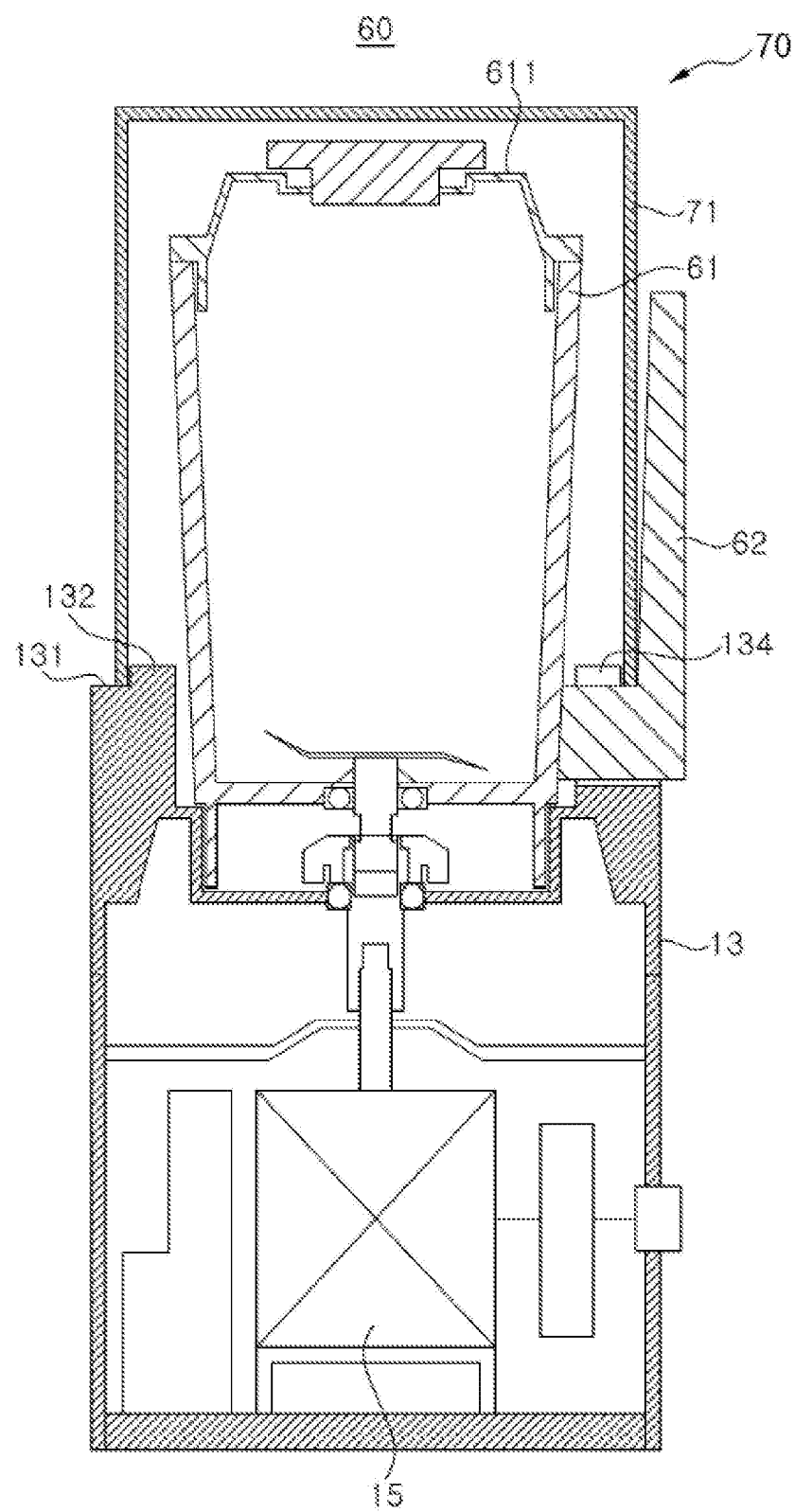

FIG. 11 is a perspective view of a blender according to a second exemplary embodiment of the present disclosure; FIG. 12 is a perspective view of the blender of FIG. 11, with a noise blocking device partially opened; FIG. 13 is a perspective view of the blender of FIG. 11 with the noise blocking device completely separated; and FIG. 14 and FIG. 15 are cross-sectional views taken along line IX-IX of FIG. 11, showing a modification of the blender.

A blender 60 according to a second exemplary embodiment of the present disclosure includes: a body 13 accommodating a drive device 15 (See, FIG. 5) and provided with a manipulation unit 14; a container 61 mounted on an upper side of the body 13; a handle 62 connected to an outer surface of the container 61; and a noise blocking device 70 having a hollow column shape open at a lower end thereof and closed at an upper end thereof and detachably connected to the upper side of the body 13 to receive the container 61 therein. The noise blocking device 70 is configured to receive the container 61 therein, whereas the handle 62 attached to one side of the container 61 is disposed outside the noise blocking device 70. The blender 60 may further include an exhaust device 30, as shown in FIG. 5.

The container 61 is formed at an upper portion thereof with an opening through which food is input for processing, and includes a lid 611 that opens or closes the opening and a processing member (not shown) configured to process the food received in the container. The container 61 may be mounted on a seat formed on an upper surface 131 of the body 13, whereby the processing member can receive drive force from the drive device received in the body 13 through a rotational force transfer mechanism including a drive shaft, a gear and the like.

The handle 62 attached to one side of a lower portion of the container 61 includes an attachment portion 621 directly connected to the container 11 and a grip portion 622 gripped by a user. The attachment portion 621 may protrude from the container 61 to extend through a handle exposing groove 711 formed at a lower side of the noise blocking device 70 when a blocking wall 71 of the noise blocking device 70 described below is closed. In addition, the attachment portion 621 may engage with the handle exposing groove 711, which can prevent the noise from leaking through the handle exposing groove 711. Further, as in the first exemplary embodiment, the noise blocking device 70 may be provided with a sealing member, for example, a packing (not shown), at an edge thereof, at which the handle exposing groove 711 is formed.

Alternatively, the noise blocking device 70 may not include the handle exposing groove 711, which is different from the embodiment shown in FIG. 11 to FIG. 13. As in the modification shown in FIG. 14 and FIG. 15, the attachment portion 621 of the handle 62 may extend through a handle exposing groove 134 formed in a connection protrusion 132 described below.

Although the attachment portion 621 is illustrated as having a parallelepiped shape in the exemplary embodiment shown in FIG. 11 to FIG. 15, it should be understood that other implementations are also possible. The shape of the attachment portion 621 may vary corresponding to the shape of the handle exposing groove 711 or 134 to engage with the handle exposing groove 711 or 134. Further, the attachment portion 621 may be stepped in a lateral direction. For example, a portion of the attachment portion 621 closer to the container 61 may have a greater width than the handle exposing groove 711 or 134, or vice versa.

In addition, the attachment portion 621 is formed at both sides thereof with grooves extending from an upper end thereof to a lower end thereof such that, when the noise blocking device 70 is mounted on the body 13 with the container 61 mounted on the seat of the body 13, both sides of the handle exposing groove 711 may be inserted into the grooves.

The grip portion 622 of the handle 62 may be provided with a portion extending from the attachment portion 621 in a lateral direction and a portion extending upwards therefrom. A gap can be formed between the portion extending upwards and a noise blocking wall 71, described below, by the portion extending in the lateral direction, such that the hand of a user can be inserted into the gap.

Although the grip portion 622 is illustrated as having a rectangular column in FIG. 11 to FIG. 15, the grip portion may have a variety of shapes capable of being gripped by a user instead of being limited thereto. For example, the grip portion 622 may have a ring shape configured to be brought into close contact with the noise blocking wall 71, or may be provided at an upper end thereof with a protrusion described below that can be brought into close contact with an outer surface of the noise blocking wall 71.

The lid 611 of the container 61 may be detachably mounted on the opening formed at the upper portion of the container 61. The lid 611 may be provided at an upper portion thereof with a check valve (not shown) that can be connected to a suction unit of an exhaust device, as shown in FIG. 5, when the noise blocking wall 71 covers the container 61. In this structure, upon operation of a vacuum pump of the exhaust device, air can be discharged from the container 61 through the check valve and an exhaust line, thereby increasing a vacuum degree inside the container 61. In addition, the suction unit and the check valve may be connected to each other through a gap therebetween via air communication instead of being directly connected to each other. That is, although the suction unit does not adjoin the check valve, the suction unit suctions air surrounding the lid 611 to increase a vacuum of an interior space of the noise blocking device 70, whereby air inside the container 61 can flow outside the container 61 through the check valve to connect the suction unit to the check valve.

Further, the sizes of the noise blocking wall 71, the container 61 and the lid 611 may be determined such that, when the noise blocking wall 71 covers as shown in FIG. 11, an upper surface of the lid 611 can be compressed by a lower surface of the noise blocking wall 71 and the force compressing the lid 611 can be transferred to the container 61 to suppress vibration of the container 61.

According to the second exemplary embodiment, the noise blocking wall 71 of the noise blocking device 70 is air-tightly connected at a lower end thereof to the upper side of the body 13 of the blender 60 and has a column shape closed at an upper end thereof so as to surround the entirety of the container 61 when the container 61 is covered and received in the noise blocking device 70.

As described above, since the handle 62 of the container 61 is disposed outside the noise blocking device 70, the noise blocking device 70 can be formed in a smaller, more compact structure. In addition, since the handle 62 of the container 61 is disposed at a lower portion of the noise blocking device 70, the noise blocking wall 71 can be composed of a single member, thereby providing a simple manufacturing process while improving the noise blocking effect by removing a noise leakage gap.

In addition, since the handle 62 of the container 61 is exposed outside the noise blocking device 70 as described above, the upper blocking wall 71 can be separated from the body 13 by lifting the container 61 using the handle 62 of the container 61 when a user removes the container 61 from the body 13. Accordingly, the blender according to this exemplary embodiment does not require a separate handle for opening the upper blocking wall 71, whereby the noise blocking device 70 can have a simpler configuration.

In addition, as in the modification shown in FIG. 5, the noise blocking wall 71 may be provided or formed therein with the exhaust line (not shown), which fluidly connects the vacuum pump 31 inside the body 13 to the suction unit (not shown) of the noise blocking wall 71.

The noise blocking wall 71 may be air-tightly detachably connected to the upper surface 131 of the body 13. To this end, a connection protrusion 132 may be formed on the upper surface 131 of the body 13. The connection protrusion 132 may protrude to a predetermined height from the upper surface 131 and may be formed in a closed curve shape or in an intermittently opened curve shape in plan view. An inner surface of the noise blocking wall 71 is brought into close contact with a lateral outer surface of the connection protrusion 132, whereby the noise blocking wall 71 can be connected to the connection protrusion 132. With this detachable structure, the noise blocking wall can be detachable from the body, thereby allowing an easy cleaning operation of the noise blocking wall. Furthermore, when the noise blocking wall is removed from the body, an upper portion of the body can be easily cleaned.

The connection protrusion 132 is formed at a portion of an outer surface thereof with a handle support 133, which protrudes beyond the connection protrusion 132 in the lateral direction to close a lower portion of the handle exposing groove 711 of the noise blocking wall 71 while supporting the lateral connection portion of the handle 622.

Further, the container 61 is formed at a lower surface thereof with a mounting portion 114 (see FIG. 5) and may be mounted on the body 13 when the mounting portion 114 of the container 61 is brought into close contact with a lateral inner surface of the connection protrusion 132.

In this structure, noise generated from a connection portion between the drive device and the rotational shaft of the container 61 can be blocked by triple walls, that is, the mounting portion 114 of the container 61, the connection protrusion 132 and the lower portion of the noise blocking wall 71, thereby improving the noise blocking effect.

The noise blocking device 70 may be dimensioned to form a gap between an outer surface of the container 61 and an inner surface of the noise blocking device 70, with the container 61 received in the noise blocking device 70. Furthermore, the noise blocking wall 71 may have a double-wall structure and may be formed of a transparent material.

Although certain exemplary embodiments have been described herein, it should be understood by those skilled in the art that these embodiments are given by way of illustration only, and that various modifications, variations, and alterations can be made without departing from the spirit and scope of the invention. Therefore, the scope of the invention should be limited only by the accompanying claims and equivalents thereof.

What is claimed is:

1. A blender for processing food, comprising:
   a container including a processing member for processing food, the processing member being rotatably mounted in the container;
   a handle having an attachment portion and a grip portion, the attachment portion connected to the container, and the grip portion extending away from the attachment portion and having a free end that is distal to the attachment portion;
   a body connected to the container and receiving a drive device for supplying drive force for rotation of the processing member of the container; and
   a noise blocking device connected to the body to define a closed space for accommodating the container, the noise blocking device comprising an enclosure having an open ended structure at a lower end thereof that interfaces with the body to define the closed space, wherein a handle exposing groove is provided in the noise blocking device or the body and is configured to insertably receive the attachment portion of the handle, and wherein in an assembled configuration the handle extends through the handle exposing groove such that a grip portion of the handle is disposed outside the noise blocking device and such that the noise blocking device and the body collectively surround a perimeter of the attachment portion of the handle to assist in suppressing noise leakage from the closed space.

2. The blender for processing food according to claim 1, wherein the enclosure of the noise blocking device comprises a noise blocking wall comprising a single member having a hollow column shape open at a lower end thereof and closed at an upper end thereof to form the open ended structure, and wherein the attachment portion of the handle is connected to a lower portion of the container and the grip portion extends upwards away from the attachment portion.

3. The blender for processing food according to claim 2, wherein a connection protrusion is formed on an upper side of the body, to which the open lower end of the noise blocking wall is connected so as to surround an outer surface of the connection protrusion.

4. The blender for processing food according to claim 3, wherein the container is provided at the lower portion thereof with a mounting portion inserted into the connection protrusion to adjoin an inner surface of the connection protrusion.

5. The blender for processing food according to claim 3, wherein the connection protrusion is formed with a handle exposing groove allowing the grip portion of the handle to extend outside the noise blocking wall therethrough.

6. The blender for processing food according to claim 2, wherein the noise blocking wall is formed at a lower end thereof with the handle exposing groove allowing the grip portion of the handle to extend therethrough.

7. The blender for processing food according to claim 2, further comprising:

an exhaust device, the exhaust device comprising a vacuum pump provided to the body, a suction unit provided to an upper portion of the noise blocking wall, and an exhaust line for connecting the vacuum pump to the suction unit.

* * * * *